United States Patent [19]

Niehaus et al.

[11] Patent Number: 4,513,995
[45] Date of Patent: Apr. 30, 1985

[54] METHOD FOR ELECTROLYTICALLY TIN PLATING ARTICLES

[75] Inventors: Norbert Niehaus, Düsseldorf; Werner Friehe, Mülheim; Wilhelm Schwenk, Duisburg, all of Fed. Rep. of Germany

[73] Assignee: Mannesmann Aktiengesellschaft, Düsseldorf, Fed. Rep. of Germany

[21] Appl. No.: 446,426

[22] Filed: Dec. 2, 1982

[51] Int. Cl.$^3$ .......................... C25D 7/04; C25D 5/50
[52] U.S. Cl. ................... 285/55; 138/DIG. 6; 148/127; 204/25; 204/34; 204/37.1; 204/37.3; 204/38.4; 285/355
[58] Field of Search ............. 204/25, 26, 34, 37 R, 204/37 T, 38 B; 148/11.5 Q, 127; 138/109, 146, 138/DIG. 6; 285/333, 334, 355, 390, 55

[56] References Cited

U.S. PATENT DOCUMENTS

| | | | |
|---|---|---|---|
| 2,084,209 | 6/1937 | McIlroy | 204/26 X |
| 3,242,565 | 3/1966 | North et al. | 29/487 |
| 4,377,302 | 3/1983 | Kohyama et al. | 285/334 |

*Primary Examiner*—G. L. Kaplan
*Assistant Examiner*—William T. Leader
*Attorney, Agent, or Firm*—Ralf H. Siegemund

[57] ABSTRACT

The thread of tubing to be used in the oil and gas industry and possibly additional services such as fee ing surfaces are cleaned, degreased, and pickled, nickel-coated without electric current at a layer thickness of about 1 micrometer, followed by electrolytic plating, preferably tin-plating, followed by storage at a temperature within the range from 150° to about 200°, which is followed by brief heating for melting the tin coating, whereupon the article is quenched.

6 Claims, No Drawings

METHOD FOR ELECTROLYTICALLY TIN PLATING ARTICLES

BACKGROUND OF THE INVENTION

The invention relates to a method for electrolytically plating articles made of chromium, chromium-molybdenum, or chromium-nickel-molybdenum alloyed stainless steel, by cleaning and degreasing, by pickling with a weak acid or a blend of acids, by electrolytically plating and by briefly melting and cooling the coating, the plating and coating is to include tin plating, plating with lead, plating with bismuth, or plating with a mixture of the stated metals.

Such a method is, for example, known from the German Pat. No. 10 15 297 for the manufacture of tin plates whereby a good resistance against corrosion is attained in such a manner that the melting of the tin coating provides for a pore free cover. In accordance with the German printed patent application 12 28 888, the corrosion resistance is to be improved further in that the melting is carried out in several intervals exceeding the melting temperature only little.

In this specification and the claims, tin plating is to be understood to cover also the coating with lead or bismuth or with a mixture of the stated metals.

It is an object of the present invention to improve the adhesiveness of a tin coating in particularly sensitive sections in tubes made of the stainless steel alloys and to extend the application of this known coating from corrosion protection to other kinds of wear. As to this, the following remarks are in order.

Pipes in the field of oil and gas extraction are screwed together to obtain tube strings whereby a large tension (area pressure in the thread) is produced for taking up the load (its onw weight, drilling power, mountain pressure). These strings are to be unscrewed while under such tension and this may possibly be carried out several times or even frequently without causing the pipes to locally coldweld to each other. This danger exists basically in all of these pipes which consist predominately of unalloyed steel and to a lesser degree for the above-mentioned stainless steel alloys. In view of the large value of the material interferences with the steel alloys as described above are particularly disadvantageous.

Therefore, another object is to be seen in applying such a coating as a lubricant upon surfaces which slide against each other under a large pressure force. The corrosion potential of the drilling hole medium does not play any part here because the pipes are made of steel alloys which resist corrosion attacks.

It is, therefore, a specific object of the present invention to improve the method for metal-plating objects made of stainless steel, such as chromium, chromium molybdenum, chromium nickel molybdenum alloyed steel by cleaning and degreasing, by pickling in a weak acid or blend of acid, by electroplating, by briefly melting the resulting coating, and by cooling that coating; the plating metal is to be tin, lead, bismuth, or a mixture thereof. In accordance with the preferred embodiment of the invention, the method as per this specific object is improved in that tube sections provided with threading are coated without the use of electric current, with a nickel coating at a thickness of approximately 1 micrometer, the coating to be carried out after the pickling, and that after the electroplating the article is stored at a temperature of between 150° and 200° C., i.e., a temperature below the melting temperature of the plating material for approximately 120 minutes to 30 minutes and that, thereafter, from that particular temperature level, the coating of the plated metal is heated for a few seconds for melting the metal plating following which the article with the coating is quenched. Therefore, the features of the invention can be generalized as involving the following: the nickel plating of the parts prior to tin plating; and the modified heat treatment which causes a large adhesive effect upon the small thread areas; and the particular basic material.

Even if it is known per se to improve the adhesiveness of metal coatings by means of intermediate layers, still the combination of materials proposed here is not known.

Contributing to the solution of the problems is, in addition, the following: the materials provided with a tin coating are tempered at a temperature between approximately 150 degrees Centigrade and approximately 200 degrees Centigrade (below the melting point of tin) for 120 to 30 minutes, whereby the hydrogen which had been absorbed up during the electrolytic tin plating from the article is now being expelled. The absorption of hydrogen is disadvantageous. On the other hand, it is unavoidable and will also be observed if, during tin plating, one operates with a high efficiency of electric current utilization.

The invention is also to be seen in that the method by itself is applied to the threads of sleeves and the abutment surface of a shoulder and the sealing surfaces of the metal to metal kind. For the practical case, that the pipes are provided with an outer threading and are to be threaded to each other by means of sleeves, it is suggested to provide just the sleeves at least over their entire interior surface with metal coatings in the stated manner.

The scope of the invention includes: an addition to the product treated in the stated manner, the sum of several pipes constituting a string of pipes in an oil field. Herein it does not matter whether the pipes are directly threaded to each other or by means of sleeves or nipples, possibly under interpositioning of thicker elements connected with the pipe ends or extensions so-called joinders.

Such a string of pipe can be used for lining a drilling bore or it can be the support string for the drill and used for flushing the drill holes or it can be used for pumping gas or oil or for other purposes including the joining of accessories to the string of pipes. It is singularly important that of a portion of this thread, at least that portion which will cooperate with another thread, preferably all sleeve threads are treated in accordance with the invention.

The method will be explained next by way of an example related to the treatment of the threads of sleeves.

The raw product is pipe sections made of stainless steel alloys which have been treated to obtain the desired mechanical strength and which have been worked to assume the final form by means of cutting to obtain a sleeve, the cutting includes particularly the cutting of threads. The sleeve is now treated in the following sequence without, however, allusion to the requisite interposed flushing and drying steps; it is first hot degreased by dipping into an alkaline material, next it is surface activated in a diluted hydrochloric acid and nitric acid blend and provided on its inside without electric current in a bath containing nickel ions to obtain a nickel layer being up to approximately one micrometer thick which occurs in dependence upon the bath concentration during a dipping period of a few seconds.

The subsequently occuring (internal) electrolytical tin plating can be carried out in an acidic or an alkaline bath. It is attempted to work with short dipping periods at a high electric current to obtain in a few seconds a thickness of the coating of about ten micrometers up to possible twice that value.

The sleeve is thereafter exposed to air at about 150 degrees Centigrade for about 1 to 2 hours. For melting the tin coating, the sleeve is preheated to about 200 to 210 degrees Centigrade and following this preheating it is heated for about 10 seconds to a temperature of 250 degrees Centigrade or for about 5 seconds to approximately 280 degrees Centigrade, and thereafter cooled quickly at least down to below the melting point of tin. For the preheating, the heating and the quenching, the sleeve is dipped into liquidous baths such as salt baths.

Due to the melting, the surface tension of the liquidous tin causes the coating to be partially taken off at the edges of the thread profile and runs, as is desired, upon the surfaces of the threaded profile including those surfaces which carry loads and slide upon each other upon threading and unthreading.

The subsequently cleaned sleeve may be oxalized (treated in oxalic acid) for improving adhesion of lubricants and is thereafter in the usual manner greased in preparation of the threading. Tests carried out by means of threading showed that neither the merely tin plated nor the additionally oxalized sleeve exhibited corrosion in the threads even in the case of applying very large thread forces up to the strength of the sleeve. A thus treated sleeve will preferably cooperate with a pin member whose threads have been phosphated or anodized in a manner known per se.

What is claimed is:

1. Method for electrolytically metal-plating tube sections made of chromium, chromium-molybdenum, or chromium-nickel-molybdenum alloy stainless steel, by cleaning and degreasing such a section, by pickling the section in a diluted acid or an acid blend, by electrolytically metal-plating the section, by briefly melting and by cooling of the metal coating characterized in that the tube section has been provided with thread and after pickling at least the threaded portion of the section is first subjected to a currentless nickel coating step to provide a nickel layer of a thickness of about 1 micrometer and then subjected to a step of electrolytic metal plating, and that after the electrolytic metal plating of the threaded portion of the section, the section is at first stored at a temperature between about 150 degrees to about 200 degrees Centigrade for about 120 to 30 minutes and is heated from that temperature for a few seconds for melting the metal coating and is immediately thereafter quenched.

2. Method in accordance with claim 1 characterized in that the tube section is a sleeve having a thread, an abutment shoulder surface, and a sealing surface, the thread and at least one of the surfaces being tin-plated.

3. Method in accordance with claim 2 characterized in that at least upon the entire inner surface of the sleeve a tin coating is deposited.

4. Method as in claim 2, wherein the sleeve is used in cooperation with at least one pin member having a threading, the thread of the pin member being phosphated or anodized.

5. Method in accordance with claim 1, wherein said metal is at least one of the following: tin, lead, bismuth.

6. A string of tubing made of threaded tubes for the oil and gas industry, using threaded sleeves for interconnecting pin members, wherein all sleeve threads are treated in accordance with the method of claim 1 and threads of all the pin members have been phosphated or anodized.

* * * * *